(12) United States Patent
Haruki et al.

(10) Patent No.: US 12,333,011 B2
(45) Date of Patent: Jun. 17, 2025

(54) INFORMATION PROCESSING APPARATUS, INFORMATION PROCESSING METHOD, AND RECORDING MEDIUM

(71) Applicant: KABUSHIKI KAISHA TOSHIBA, Tokyo (JP)

(72) Inventors: Hiroyoshi Haruki, Kawasaki Kanagawa (JP); Jun Kanai, Tokyo (JP); Tatsuya Uehara, Kawasaki Kanagawa (JP); Fumihiko Sano, Kawasaki Kanagawa (JP); Noritaka Deguchi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 17/653,627

(22) Filed: Mar. 4, 2022

(65) Prior Publication Data

US 2022/0398317 A1    Dec. 15, 2022

(30) Foreign Application Priority Data

Jun. 15, 2021    (JP) ................................. 2021-099531

(51) Int. Cl.
*G06F 21/00*     (2013.01)
*G06F 21/57*     (2013.01)

(52) U.S. Cl.
CPC ........ *G06F 21/57* (2013.01); *G06F 2221/033* (2013.01)

(58) Field of Classification Search
CPC .. G06F 21/57; G06F 2221/033; G06F 21/554; G06F 21/64; G06F 21/566
See application file for complete search history.

(56) References Cited

U.S. PATENT DOCUMENTS

| | | | |
|---|---|---|---|
| 11,132,467 B2 | 9/2021 | Komatsubara et al. | |
| 11,272,075 B2 | 3/2022 | Kawazu | |
| 11,768,955 B2 * | 9/2023 | Singh | H04L 63/1416 726/26 |
| 2014/0047106 A1 * | 2/2014 | Leung | H04L 41/5012 709/224 |

(Continued)

FOREIGN PATENT DOCUMENTS

| | | |
|---|---|---|
| DE | 10 2004 040 695 A1 | 9/2006 |
| JP | 2001282619 | * 10/2001 |

(Continued)

*Primary Examiner* — Ghazal B Shehni
(74) *Attorney, Agent, or Firm* — Finnegan, Henderson, Farabow, Garrett & Dunner, LLP

(57) ABSTRACT

An information processing apparatus has a deployment unit configured to deploy an image file and to create files used for a virtual environment, a virtual environment creator configured to create the virtual environment using the files, a recorder configured to record information about a first file included in the files, a manager configured to access the first file stored in the virtual environment and to determine, based on information acquired by accessing the first file, whether to execute software whose execution was detected in the virtual environment, and a normality determinator configured to determine, based on a difference between information acquired by accessing the first file and information about the recorded first file, whether the first file is normal.

16 Claims, 11 Drawing Sheets

(56) References Cited

U.S. PATENT DOCUMENTS

| | | | | |
|---|---|---|---|---|
| 2014/0181975 | A1* | 6/2014 | Spernow | G06F 21/568 |
| | | | | 726/23 |
| 2014/0189643 | A1* | 7/2014 | Raghunathan | G06F 9/45533 |
| | | | | 717/120 |
| 2016/0283261 | A1* | 9/2016 | Nakatsu | G06F 9/45558 |
| 2020/0104492 | A1* | 4/2020 | Boulton | G06F 8/77 |
| 2022/0398120 | A1 | 12/2022 | Kanai et al. | |

FOREIGN PATENT DOCUMENTS

| | | | |
|---|---|---|---|
| JP | 2011-60035 A | | 3/2011 |
| JP | 5126447 B1 | | 1/2013 |
| JP | 2019-66926 A | | 4/2019 |
| JP | 2020-46829 A | | 3/2020 |
| JP | WO2020183828 | * | 9/2020 |
| JP | 2021-5335 A | | 1/2021 |
| JP | 6840063 B2 | | 3/2021 |
| JP | 2022-188598 A | | 12/2022 |

* cited by examiner

| VIRTUAL ENVIRONMENT IDENTIFICATION INFORMATION | PATH NAME | HASH VALUE |
|---|---|---|
| 0x1234 | /virtual /container1/allow - list | 0xcafebabe......123456 |
| 0x5678 | /virtual /container2/allow - list | 0x654321........aabbcc |
| 0x9abc | /virtual /container3/allow - list | 0xabc321.......abc321 |

FIG. 2

INFORMATION PROCESSING APPARATUS, INFORMATION PROCESSING METHOD, AND RECORDING MEDIUM

CROSS REFERENCE TO RELATED APPLICATIONS

This application is based upon and claims the benefit of priority from the prior Japanese Patent Application No. 2021-99531, filed on Jun. 15, 2021, the entire contents of which are incorporated herein by reference.

FIELD

Embodiments in the present disclosure relates to an information processing apparatus, an information processing method, and a recording medium.

BACKGROUND

As one of virtualization technologies, there is a container type virtualization technology. In the container type virtualization technology, execution of an application in a virtual environment (container) is controlled by a host operating system (OS). For example, when an application is about to be launched in the virtual environment, a call (system call) is made to the kernel of the host OS, and the kernel processes the system call, so that the application operates. Therefore, in the container type virtualization technology, a plurality of virtual environments shares a resource of a host environment.

However, there are many demands that it is desired to change the execution authority of the application for each virtual environment. For this purpose, the host environment is required to check in which virtual environment the application has been launched at the time of launching the application, and determine whether to permit execution of the application based on the setting (in other words, the security policy) regarding the security of the checked virtual environment.

For convenience of management or the like, there may be a case where it is desired to store the file indicating the setting related to security in the virtual environment instead of the host. However, such a handling may receive an attack such as deletion of the file in the virtual environment, and may be a factor of vulnerability.

BRIEF DESCRIPTION OF THE DRAWINGS

FIG. 2 is a diagram illustrating an example of recorded information.

DETAILED DESCRIPTION

An information processing apparatus according to an embodiment of the present disclosure includes a deployment unit configured to deploy an image file and to generate files used for a virtual environment;
a virtual environment creator configured to create the virtual environment using the files;
a recorder configured to record information about a first file included in the files;
a manager configured to access the first file stored in the virtual environment and to determine, based on information acquired by accessing the first file, whether to execute software whose execution was detected in the virtual environment; and
a normality determinator configured to determine, based on a difference between information acquired by accessing the first file and information about the recorded first file, whether the first file is normal.

Hereinafter, embodiments of the present disclosure will be described with reference to the drawings.

First Embodiment

Figure 1:
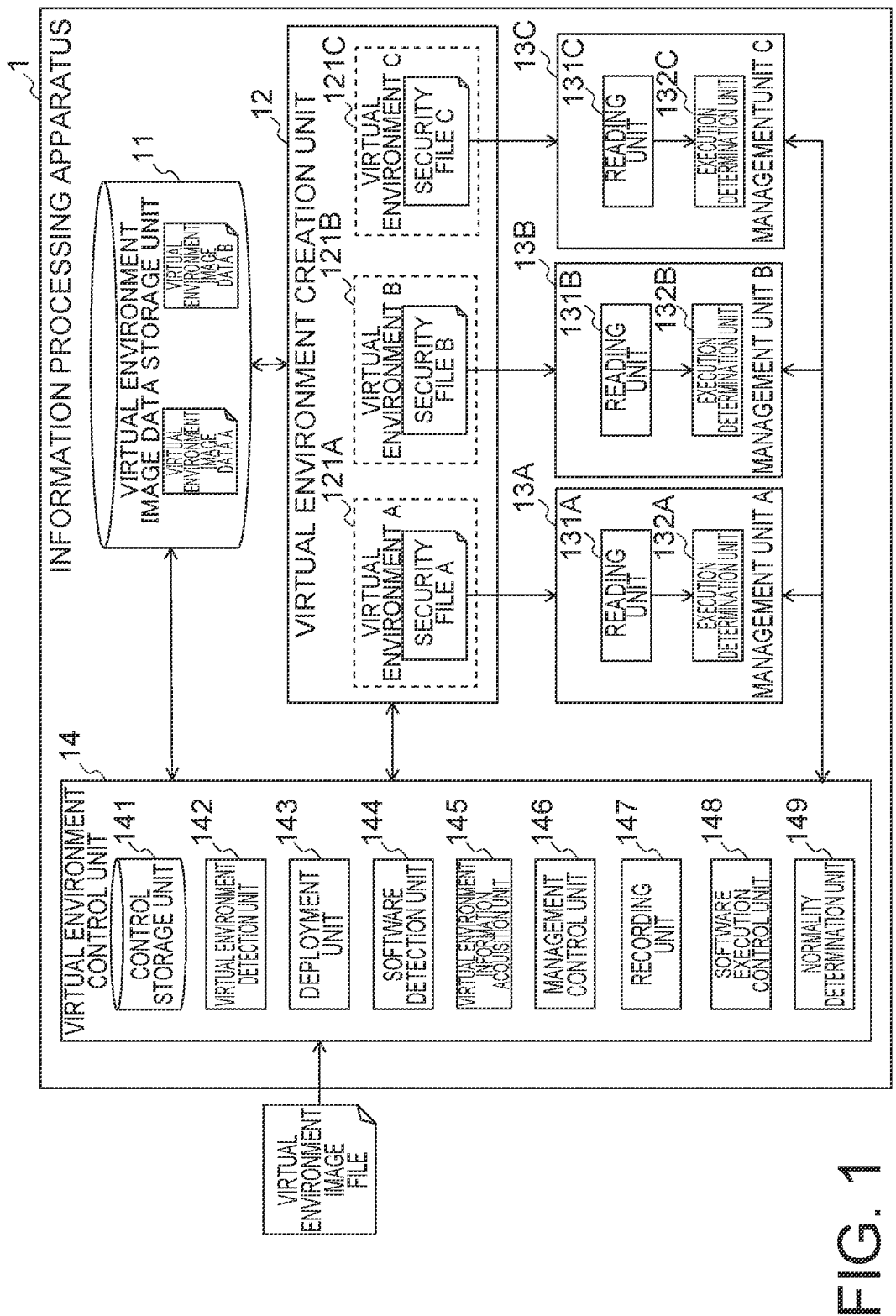
FIG. 1 is a block diagram illustrating an example of an information processing apparatus according to the first embodiment.

FIG. 1 is a block diagram illustrating an example of the information processing apparatus according to the first embodiment. An information processing apparatus 1 according to the first embodiment includes a virtual environment image data storage unit 11, a virtual environment creation unit 12, a management unit 13, and a virtual environment control unit 14. The virtual environment control unit 14 includes a control storage unit 141, a virtual environment detection unit 142, a deployment unit 143, a software detection unit 144, a virtual environment information acquisition unit 145, a management control unit 146, a recording unit 147, a software execution control unit 148, and a normality determination unit 149. Note that alphabets of reference numerals in FIG. 1 are used to distinguish the same components.

Note that the components illustrated in FIG. 1 are for describing the process of the present embodiment, and other components may be present. Further, the components illustrated in FIG. 1 may be divided into a plurality of parts, or a plurality of components may be combined into one.

The information processing apparatus 1 of the present embodiment is an apparatus capable of providing one or more virtual environments 121. Implementation and provision of the virtual environment 121 may be similar to those in the conventional method, and for example, it is possible to create the virtual environment 121 using a predetermined virtual environment image file. The virtual environment image file may be stored in the information processing apparatus 1 in advance, or as illustrated in FIG. 1, the virtual environment image file corresponding to the virtual environment 121 desired to be executed may be acquired from an external device such as a repository server.

Note that the virtual environment image file includes a file related to the virtual environment 121, and may include, for example, a virtual environment setting file, a virtual environment security file, a virtual environment file, and the like. Hereinafter, the files included in the virtual environment image file is collectively referred to as virtual environment image data.

The virtual environment setting file is a file in which information necessary for executing the virtual environment 121 is described. For example, the name of the OS and the name of the software executed in the virtual environment 121 are described. The virtual environment security file indicates information about security of the virtual environment 121. The virtual environment security file may be, for example, a permission list indicating software that permits execution in the virtual environment 121 or a non-permission list indicating software that prohibits execution in the virtual environment 121. Hereinafter, the virtual environment security file is simply referred to as a security file. The virtual environment file is a file executed in the virtual environment 121, such as a shared library, a script file, or a software setting file.

Software is executable in the virtual environment 121. The information processing apparatus 1 detects launch of software in the virtual environment 121, and checks whether execution of the software is appropriate, in other words, whether the software may be executed, based on the security file. Then, the software confirmed to be appropriate is executed, and the software confirmed not to be appropriate is terminated. By performing execution control of the software in the virtual environment 121 in this manner, the virtual environment 121 is protected.

For example, it is assumed that a virtual environment image file including a security file is distributed from the repository server to the information processing apparatus 1. A distribution method and a deployment method of the virtual environment image file may be similar to the existing method. When the virtual environment image file is deployed to create the virtual environment 121 based on the virtual environment image data, the security file can be accessed in the virtual environment 121.

Note that the virtual environment 121 may be created based on the virtual environment image file that does not include the security file. In this case, the software executed in the created virtual environment 121 is not limited. That is, in a case where the virtual environment 121 does not include the security file, the execution of the software in the virtual environment 121 is not terminated based on the security file.

Note that, although software is also referred to as an application depending on the use and the like, the term software is used without distinguishing them in the present disclosure. That is, the application is included in the software.

Note that the software of the virtual environment 121 uses a resource of the host environment such as a kernel, a device driver, and the like for execution. Therefore, it is possible to detect and control execution of software.

Processing of each component of the information processing apparatus 1 will be described.

The virtual environment image data storage unit 11 stores the virtual environment image data in an area provided for each virtual environment 121. For example, when the image data of a virtual environment 121A is stored in the area of "/virtual/container)/", the image data of a virtual environment 121B is stored in the area of "/virtual/container2/" different from "/virtual/container)/".

The data used in the virtual environment 121 is the virtual environment image data stored in the virtual environment image data storage unit 11. In addition, the virtual environment image data stored in the virtual environment image data storage unit 11 may be different for each virtual environment 121. Therefore, since the security files in each virtual environment 121 may also be different, there may be a plurality of virtual environments 121 with different security levels at the same time.

The virtual environment creation unit 12 creates (launches) the virtual environment 121 using the virtual environment image data in the virtual environment image data storage unit 11. In other words, the virtual environment creation unit 12 creates a process of the virtual environment 121. Software is executed in the created virtual environment 121. For example, in a case where the container type virtualization technology is used, the virtual environment creation unit 12 corresponds to a container engine, and the virtual environment 121 corresponds to a container. Note that the virtualization technology used by the information processing apparatus 1 is not limited to the container type virtualization technology, and a virtualization technology capable of performing similar processing may be used. The number of the created virtual environment 121 may be plural as illustrated in FIG. 1 or may be one.

In addition, the virtual environment creation unit 12 deletes (ends) the virtual environment 121 in response to the instruction. In other words, the virtual environment creation unit 12 deletes the process of the virtual environment 121. In the present embodiment, the virtual environment image data corresponding to the deleted virtual environment 121 is not deleted from the virtual environment image data storage unit 11 simultaneously with the deletion of the virtual environment 121. Therefore, after deleting the virtual environment 121, it is possible to resume the same virtual environment 121 using the virtual environment image data stored in the virtual environment image data storage unit 11. That is, it is possible to relaunch the virtual environment 121.

The management unit 13 manages the virtual environment 121, and makes an execution determination to determine whether to execute software based on the information from the virtual environment control unit 14 when the launch of the software is detected in the virtual environment 121 managed. Note that since the launch of the software is detected by the virtual environment control unit 14, the management unit 13 is instructed by the virtual environment control unit 14 to execute the determination.

Note that FIG. 1 illustrates that a management unit 13A manages the virtual environment 121A, a management unit 13B manages the virtual environment 121B, and a management unit 13C manages the virtual environment 121C. In this manner, one management unit 13 may manage one virtual environment 121, or one management unit 13 may manage a plurality of virtual environments 121.

A reading unit 131 of the management unit 13 accesses the security file stored in the virtual environment 121 managed and acquires information about the security file. For example, information registered in the security file is read. The information may indicate software that can be executed in the virtual environment 121 or may indicate software that cannot be executed. When the security file is not stored in the virtual environment 121, information that the security file does not exist is acquired as the information about the security file. In addition, an execution determination unit 132 of the management unit 13 makes the execution determination of the software the launch of which is detected in the virtual environment 121 based on the information about the security of the virtual environment 121 acquired by the access and the information from the virtual environment control unit 14.

Examples of the information used for the execution determination of the software include a path name of the software and a hash value of an execution image of the software. For example, in a case where the path name of the permitted software is indicated in the security file, when the path name of the software transmitted from the virtual environment control unit 14 is described in the security file, the execution determination unit 132 determines that the execution of the software is appropriate, and otherwise, determines that the execution of the software is inappropriate. Furthermore, for example, a hash value may be calculated based on the information acquired from the virtual environment 121, compared with the hash value acquired from the virtual environment control unit 14, and in a case where the two hash values are the same, it may be determined that the software is normal, and in a case where they are different, it may be determined that the software is not normal, that is, abnormal.

Note that, in a case where there is no security file in the virtual environment 121, the execution determination unit 132 may determine that "this virtual environment 121 is not an environment in which execution of software is controlled" and all software may be executed. When it is confirmed that the security file does not exist in the virtual environment 121, it is recorded that the security file does not exist in the virtual environment 121, and thereafter, it may be determined that the software may be executed based on the record. Note that, in a case where there is no security file in the virtual environment 121, it may be determined that execution of all software is inappropriate, or it may be determined that execution of software other than predetermined software is inappropriate.

The virtual environment control unit 14 performs processing for enabling the virtual environment image data storage unit 11, the virtual environment creation unit 12, and the management unit 13 to perform the above-described processing. In addition, it performs execution control of the software based on the execution determination of the management unit 13. This protects the virtual environment 121.

Further, the virtual environment control unit 14 makes a normality determination to determine whether the security file of the virtual environment 121 is normal, separately from the software execution determination by the management unit 13. Since the security file is accessible from the virtual environment 121, malicious software can attack the security file. For example, as described above, when it is determined that all software may be executed in a case where there is no security file, a problem occurs in a case where the security file is deleted by an attack. The normality determination is made to prevent the problem.

The components in the virtual environment control unit 14 will be described.

The control storage unit 141 stores data used by the virtual environment control unit 14. The data to be stored is not particularly limited. Data used for processing each component and a processing result of each component may be stored in the control storage unit 141. For example, as will be described later, data indicating a correspondence relationship between the management unit 13 and the virtual environment 121 and the like are stored.

The virtual environment detection unit 142 detects creation and deletion of the virtual environment 121. For example, a process ID corresponding to the virtual environment 121 may be monitored, or launch of predetermined software executed at the time of creation and deletion of the virtual environment 121 may be detected.

Note that, in the present embodiment, it is assumed that the virtual environment control unit 14 independently detects the creation and deletion of the virtual environment 121, but the virtual environment creation unit 12 may notify the virtual environment control unit 14 of the creation and deletion of the virtual environment 121.

The deployment unit 143 deploys a virtual environment image file corresponding to the created virtual environment 121 to create virtual environment image data, in other words, a file used for the virtual environment 121. As a result, the virtual environment creation unit 12 can create the virtual environment 121. When there is a security file in the virtual environment image file, the security file is also included in the created virtual environment image data. As described above, the deployment unit 143 stores the created virtual environment image data in different areas for each virtual environment 121 in the virtual environment image data storage unit 11.

Note that the deployment unit 143 may develop a virtual environment image file designated by a user who uses the virtual environment 121 or the like, or may select one from a plurality of virtual environment image files based on information about the user.

As described above, the virtual environment 121 may be recreated (relaunched) using the same virtual environment image file even when it is deleted. Therefore, the deployment unit 143 deploys the virtual environment image file when the virtual environment image data is not stored in the virtual environment image data storage unit 11.

The software detection unit 144 detects launch of software in the virtual environment 121. The detection can be realized by various means. For example, launch of software can be detected using an OS mechanism called a hook.

The virtual environment information acquisition unit 145 acquires information about the detected software. For example, similarly to the software detection method, information such as a path name of the software and an identifier of the virtual environment 121 in which the software is executed can be acquired using the hook. The acquired information about the software is transmitted to the management unit 13 and used for execution determination of the software. For example, the execution determination of the software is made based on whether there is a difference in the path name or the like of the software.

In addition, the virtual environment information acquisition unit 145 also acquires information such as an identifier of the virtual environment 121 and a file in the virtual environment 121. For example, for the path name of a security file, the virtual environment image data corresponding to the virtual environment 121 to be checked is extracted from the virtual environment image data storage unit 11, and the security file in the virtual environment image data is searched for, whereby the path name of the security file can be acquired.

The management control unit 146 manages each virtual environment 121, and in a case where the execution of the software is detected in any of the one or more virtual environments 121, instructs the management unit 13 that manages the detected virtual environment 121 to determine whether to execute the software in the detected virtual environment 121.

Note that which virtual environment 121 the management unit 13 manages may be determined by the management control unit 146. In addition, the recording unit 147 records which virtual environment 121 the management unit 13 manages in the control storage unit 141 as data indicating a correspondence relationship between the management unit 13 and the virtual environment 121. The record is used to check the management unit 13 that manages the virtual environment 121 when the execution of the software is detected.

The management control unit 146 may create the management unit 13. In other words, it may create a process corresponding to the management unit 13. For example, when the virtual environment detection unit 142 detects the creation of the virtual environment 121, the management control unit 146 may newly create the management unit 13 that manages the created virtual environment 121. Alternatively, the management control unit 146 may create the management unit 13 that manages the detected virtual environment 121 at a time point when it is determined that there is no management unit 13 that manages the detected virtual environment 121. In addition, when the virtual environment 121 is deleted, the management unit 13 that manages the deleted virtual environment 121 may be deleted.

Note that a case where the determination by the management unit 13 is not normally made is also assumed. Therefore, the management control unit 146 may perform an error process when the determination by the management unit 13 is not normally made. It is assumed that there are various causes for which the determination by the management unit 13 has not been made normally, but the cause is not particularly limited, and it may simply perform the error process in a case where the determination result cannot be acquired from the management unit 13 within a predetermined time. The management control unit 146 may transmit an error to the outside of the virtual environment control unit 14, for example. In addition, the management control unit 146 may make the determination instead of the management unit 13. For example, in any virtual environment 121, it may be determined that only predetermined software is permitted and the others are rejected. Alternatively, it may be determined that any software is uniformly permitted or not permitted. Note that, also in a case where the determination is made on behalf of the management unit 13, the determination result may be different for each virtual environment 121.

The software execution control unit 148 controls execution of software in the virtual environment 121 based on a result of execution determination of software by the management unit 13 and the like. For example, in a case where the software launched in the virtual environment 121 is determined to be inappropriate, the software execution control unit 148 performs control to end the execution of the software. Note that the software execution control unit 148 may suspend the software in order to make an execution determination in the middle of the launch process of the software.

In addition, the software execution control unit 148 may output information about execution of software. For example, when the software launched in the virtual environment 121 is determined to be inappropriate, the software execution control unit 148 may output an error. The error may be output to the virtual environment 121, or may be output to a predetermined log, a monitor connected to the information processing apparatus 1, or the like in order to notify the administrator of the information processing apparatus 1.

As described above, in a case where the execution of the software in the virtual environment 121 is controlled based on the security file read from the virtual environment, it is not necessary for the virtual environment control unit 14 to manage the security policy for each virtual environment 121, and it is only necessary to deploy the virtual environment image file along the security policy of the virtual environment 121. Therefore, it is possible to reduce the management cost of the virtual environment control unit 14. An existing distribution method and deployment method of an existing virtual environment image file can also be used.

However, as described above, since the security file is included in the virtual environment 121, there is also a possibility that malicious software in the virtual environment 121 deletes or modifies the security file. For example, in a case where execution of all software is permitted when there is no security file, when the security file itself is deleted, actually prohibited software is executed. In addition, in a case where the security file is a non-permission list, when the registered software is deleted from the non-permission list, actually prohibited software is executed. In addition, when the security file is a permission list, there is also a possibility that fraud of adding software to the permission list is executed.

Therefore, in the present embodiment, execution of prohibited software due to deletion or modification of the security file in the virtual environment 121 is prevented. Specifically, it is confirmed that the information about the security file is not different from the record at the time when the virtual environment 121 is first created.

The information about the security file is acquired by the virtual environment information acquisition unit 145. That is, the virtual environment information acquisition unit 145 acquires not only the information about the detected software but also the information about the virtual environment 121. As the acquired information about the virtual environment 121, for example, information for identifying the virtual environment 121 (for example, the ID of the virtual environment 121), a path name of a security file of the virtual environment 121, and the like are acquired. The acquisition of the information about the virtual environment 121 is not particularly limited although it is assumed that the creation of the virtual environment 121 is detected by the virtual environment detection unit 142.

Furthermore, the virtual environment information acquisition unit 145 may calculate the hash value based on information such as the content of the file in the virtual environment 121. The calculated hash value can be used to recognize whether modification or the like of the file has been performed.

The recording unit 147 records normal information about the virtual environment 121. For example, since it is considered that the information acquired by the virtual environment information acquisition unit 145 when the virtual environment 121 has been created for the first time since the virtual environment image file was deployed by the deployment unit 143 has not been attacked before, the recording unit 147 may regard and record the information as normal information. The recorded information is used as a determination criterion for normality determination. Note that it is not necessary to record all the information acquired by the virtual environment information acquisition unit 145, and it is sufficient to store information used for normality determination.

FIG. 2 is a diagram illustrating an example of recorded information. In the example of FIG. 2, information for identifying the virtual environment 121 and the path name of the security file stored in the virtual environment 121 are included and stored so that the correspondence relationship therebetween can be known. "Virtual environment identification information" is indicated as the item name in the first column on the left side of the table in FIG. 2, and this represents information for identifying the virtual environment 121. For example, an ID or the like of the virtual environment 121 corresponds to the virtual environment identification information. In the second column on the left side of FIG. 2, the path name of the security file included in the virtual environment 121 is indicated. For example, the virtual environment 121 whose virtual environment identification information is "0x1234" has a security file, and indicates that the security file is stored in "/virtual/container1/allow-list". In addition, as in the example of FIG. 2, information such as a hash value may be included in the record. In this manner, the recording unit 147 records information about the security file and the like included in the virtual environment image data.

The normality determination unit 149 determines whether it is normal by checking whether there is a difference between the information about the virtual environment 121 recorded by the recording unit 147 and the information about the virtual environment 121 acquired after the recording. For example, when the path name of the recorded security file does not match the path name of the security file acquired after the recording, it is determined that it is an abnormal. In a case where it is determined that it is abnormal, the predetermined process is performed. For example, in order to notify the administrator of the information processing apparatus 1 of the abnormal event, an error may be output to a predetermined log, a monitor connected to the information processing apparatus 1, or the like. In addition, the virtual environment creation unit 12 may be notified to stop the virtual environment 121 including the security file determined to be abnormal.

Figure 3:
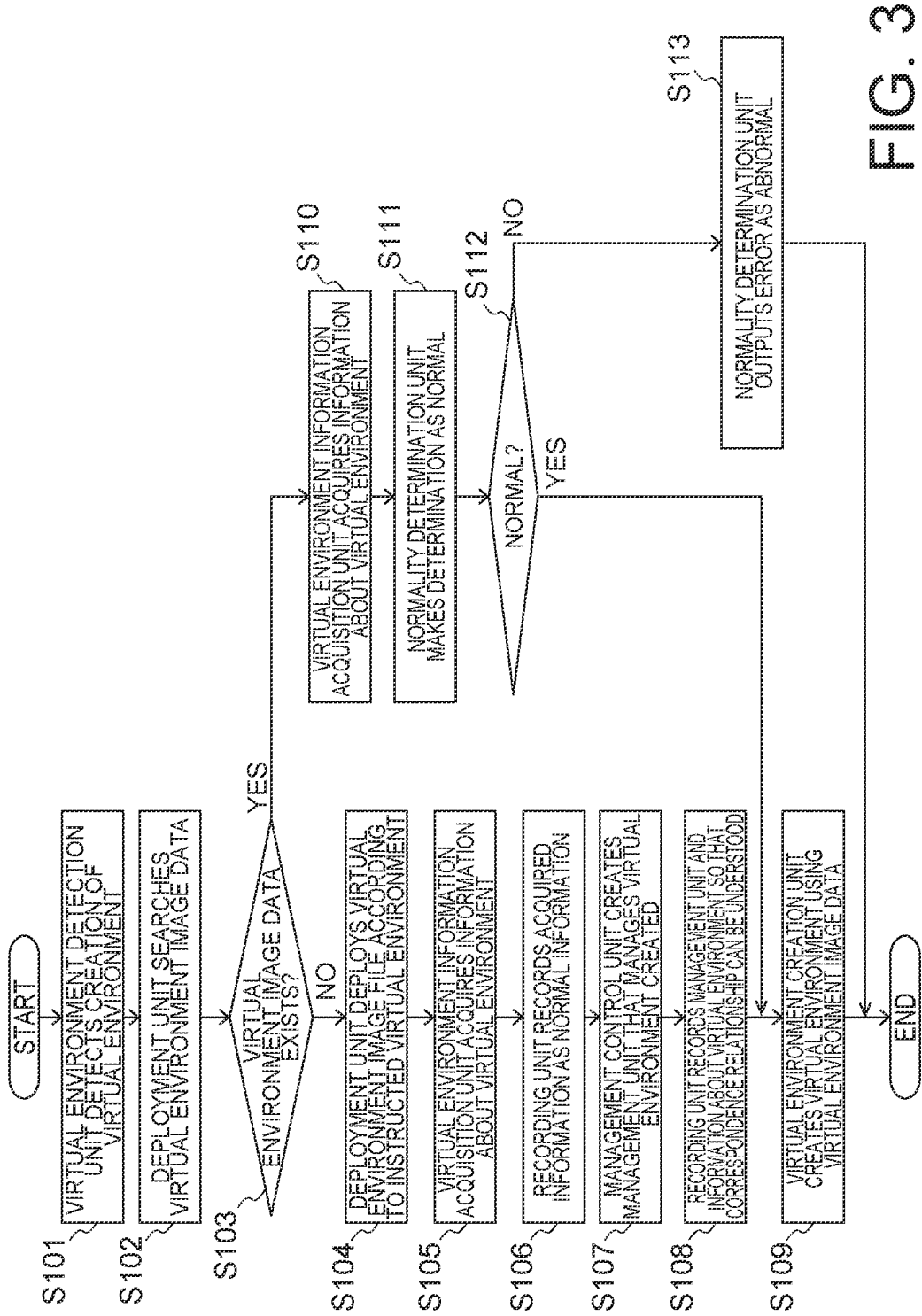
FIG. 3 is a schematic flowchart of processing at the time of launch of the virtual environment according to the first embodiment.

Next, a flow of each process of the information processing apparatus 1 will be described. FIG. 3 is a schematic flowchart of processing at the time of launch of the virtual environment 121 according to the first embodiment. Note that the flow in the present disclosure is an example, and the order of each processing is not limited to the example. For example, two processes described in order may be performed in parallel.

First, the virtual environment detection unit 142 detects creation of the virtual environment 121 (S101). Since the detection includes detection of recreation (relaunch) of the virtual environment 121, the deployment unit 143 searches whether the virtual image data of the detected virtual environment 121 is stored in the virtual data storage unit (S102).

When there is no virtual image data in the virtual data storage unit (NO in S103), the deployment unit 143 deploys the virtual environment image file and creates virtual environment image data (S104). For example, this corresponds to a case where the virtual environment 121 is newly created. Then, the virtual environment information acquisition unit 145 acquires information about the virtual environment 121 whose creation is detected by the virtual environment detection unit 142 (S105). The acquired information includes an identifier of the virtual environment 121, a path name of a security file, and the like. The recording unit 147 records the acquired information (S106). The recorded information is treated as normal information.

Then, the management control unit 146 creates the management unit 13 that manages the created virtual environment 121 (S107), and the recording unit 147 records the management unit 13 and the information about the virtual environment 121 so that the correspondence relationship can be understood (S108). Then, the virtual environment creation unit creates the virtual environment 121 using the virtual environment image data (S109), and this flow ends.

On the other hand, when the virtual image data has been created in the virtual data storage unit (YES in S103), the virtual environment image file is not deployed, and the virtual environment information acquisition unit 145 acquires information about the virtual environment 121 whose creation has been detected by the virtual environment detection unit 142 (S110). For example, this corresponds to a case where the virtual environment 121 is relaunched. Note that the acquired information is not recorded by the recording unit 147. This is because the acquired information may not be normal due to an attack from a third party.

Then, the normality determination unit 149 makes a normality determination based on the acquired information and the recorded information (S111). For example, when the acquired path name of the security file matches the path name recorded in the security file storage unit, it may be determined as normal, and otherwise, it may be determined as abnormal. In a case where it is determined that it is not normal (NO in S112), the normality determination unit 149 outputs an error for making notification of an abnormal event (S113), and the flow ends. When it is determined as normal (YES in S112), the virtual environment creation unit creates the virtual environment 121 using the virtual environment image data (S109), and this flow ends.

Using this flow, detection when malicious software actually causes a problem in a security file will be exemplified. For example, a case where malicious software enters the virtual environment 121B, deletes the security file included in the virtual environment 121B, and then relaunches the virtual environment 121B will be described. The identifiers of the three virtual environments 121A, B, and C are "0x1234", "0x5678", and "0x9abc", respectively. Further, a valid path name of the security file of the virtual environment 121B is "/virtual/container2/allow-list".

As illustrated in the flowchart of FIG. 3, first, the virtual environment 121 launch unit detects the relaunch of the virtual environment 121B (S101). Since the virtual environment image data exists for relaunch (YES in S103), the virtual environment information acquisition unit 145 acquires the identifier "0x5678" of the virtual environment 121B, the path name of the security file of the virtual environment 121B, and the like (S110). Since the security file of the virtual environment 121B has been deleted, the acquired path name is "NULL". The normality determination unit 149 recognizes the identifier "/virtual/container2/allow-list" of the virtual environment 121B on the record, and determines that it is abnormal since the identifier is different from the path name "NULL" of the security file acquired by the virtual environment information acquisition unit 145 (S112). Then, since it is determined as abnormal (NO in S112), an error is output for abnormality determination (S113).

Note that it is also assumed that malicious software operating on the virtual environment 121 adversely affects another virtual environment 121. For example, the virtual environment 121A may have stopped execution (the virtual environment image data of the virtual environment 121A has not been deleted), the virtual environment 121B and the virtual environment 121C may be operating, and malicious software that operates on the virtual environment 121C may mount the virtual environment 121A in the virtual environment image data, delete the security file (path name: /virtual/container1/allow-list) included in the virtual environment 121A, and then activate the virtual environment 121A. However, even in this case, since the identifier of the virtual environment 121A on the record is different from the path name "NULL" of the security file acquired by the virtual environment information acquisition unit 145, an error can be output as an abnormal event.

Figure 4:
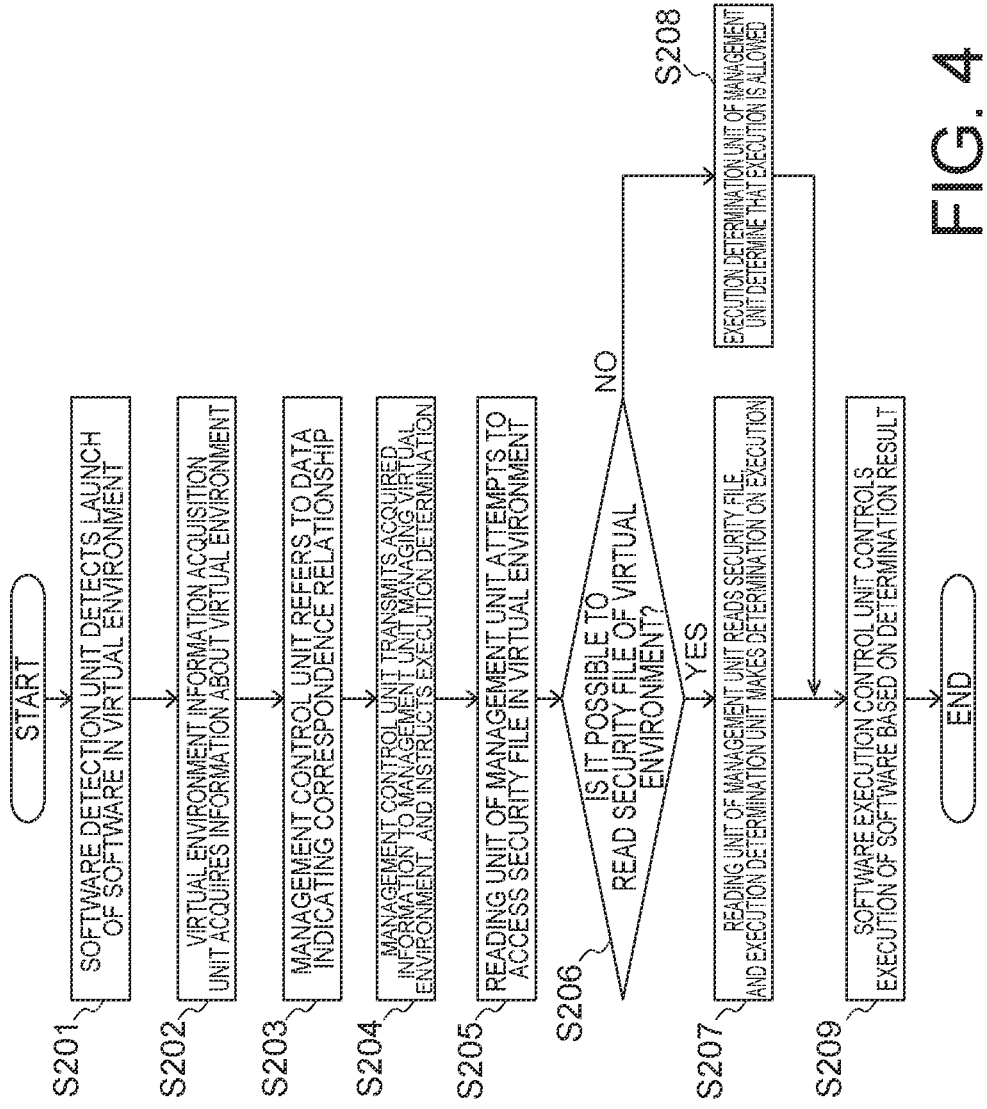
FIG. 4 is a schematic flowchart of processing related to execution control of software according to the first embodiment.

Next, a flow of the process of execution control of software will be described. FIG. 4 is a schematic flowchart of processing related to execution control of software according to the first embodiment.

The software detection unit 144 detects launch of software in the virtual environment 121 (S201), and the virtual environment information acquisition unit 145 acquires information about the virtual environment 121 such as an identifier of the virtual environment 121 and a path name of the software (S202).

The management control unit 146 refers to the data indicating the correspondence relationship between the virtual environment 121 and the management unit 13 (S203), and instructs the management unit 13 that manages the detected virtual environment 121 to transmit the information about the virtual environment 121 used for the execution determination and make the execution determination (S204). The reading unit 131 of the management unit 13 that has received the instruction attempts to access the security file in the virtual environment (S205).

When the security file of the virtual environment 121 can be read (YES in S206), the reading unit 131 of the management unit 13 reads the security file, and the execution determination unit 132 determines whether to execute the software (S207). When the security file of the virtual environment 121 cannot be read because the security file does not exist (NO in S206), the execution determination unit 132 determines that the execution of the software is appropriate as described above (S208).

Then, the software execution control unit 148 controls the execution of the software based on the determination result of whether to execute the software (S209). When there is a problem with the determination, the software is not executed. When the software is not executed, software that outputs a warning message may be executed. Execution control is performed in this manner, and this flow ends.

Note that, as illustrated in FIG. 3, it is assumed that the normality determination by the normality determination unit 149 is made at the time of launch or relaunch of the virtual environment 121, but the normality determination may be made at a time other than at the time of launch or relaunch of the virtual environment 121. For example, when the virtual environment information acquisition unit 145 acquires the information about the virtual environment 121, the normality determination may be made using the information. Therefore, when the launch of the software of FIG. 4 is detected, the normality determination unit 149 may make the normality determination based on the information acquired by the virtual environment information acquisition unit 145 and the recorded information, similarly to when the launch of the virtual environment 121 is detected. Then, the software execution control unit 148 may control the execution of the software based on both the determination result on whether to execute the software and the normality determination result of the security file. The execution timing of the normality determination may be appropriately determined. The determination may be made in parallel with the execution determination, or may be made before and after the execution determination. In addition, in a case where the result of one, of the execution determination or the normality determination, which was made first is bad, the other may not be made.

Using this flow, execution determination of software in the virtual environment 121 will be exemplified. It is assumed that reading of the security file is performed at the time of launch or relaunch.

For example, in a case where the file "/bin/user.exe" registered in the security file of the virtual environment 121A is started to be executed on the virtual environment 121A, the process is performed as follows. The software detection unit 144 detects the start of execution of "/bin/user.exe" (S201). The virtual environment information acquisition unit 145 acquires the file name "/bin/user.exe" as software information (S202). The acquired information is transmitted to the management unit 13A that manages the virtual environment 121A via the management control unit 146 (S204), and a reading unit 131A of the management unit 13A checks whether "/bin/user.exe" is included in the security file in the virtual environment 121A (S205). Since "/bin/user.exe" is registered in the security file in the virtual environment 121A, the execution determination unit 132A of the management unit 13A determines that execution of "/bin/user.exe" is appropriate (S207). Therefore, the software execution control unit 148 starts execution of "/bin/user.exe" in the virtual environment 121A (S209).

Furthermore, for example, in a case where the file "/bin/mal.exe" not registered in the security file of the virtual environment 121B is executed on the virtual environment 121B, processing is performed as follows. The software detection unit 144 detects the start of execution of "/bin/mal.exe" (S201). The virtual environment information acquisition unit 145 acquires the file name "/bin/mal.exe" as software information (S202). The acquired information is transmitted to the management unit 13B that manages the virtual environment 121B via the management control unit 146 (S204), and the reading unit 131B of the management unit 13B checks whether "/bin/mal.exe" is included in the security file in the virtual environment 121B (S205). Since "/bin/mal.exe" is not registered in the security file in the virtual environment 121B, the execution determination unit 132B of the management unit 13B determines that "/bin/mal.exe" should not be executed (S207). Therefore, the software execution control unit 148 stops the execution of "/bin/mal.exe" in the virtual environment 121B (S209).

Furthermore, for example, in a case where execution is performed by "/bin/cafe.exe" on the virtual environment 121C in which the security file does not exist, processing is performed as follows. The software detection unit 144 detects the start of execution of "/bin/cafe.exe" (S201). The virtual environment information acquisition unit 145 acquires the file name "/bin/cafe.exe" as software information (S202). The acquired information is transmitted to the management unit 13C that manages the virtual environment 121C via the management control unit 146 (S204), and a reading unit 131C of the management unit 13C attempts to access the security file in the virtual environment 121C (S205). However, since there is no security file in the virtual environment 121C (NO in S206), the execution determination unit 132 of the management unit 13C determines that execution of "/bin/cafe.exe" is appropriate (S208). Therefore, the software execution control unit 148 starts execution of "/bin/cafe.exe" in the virtual environment 121C (S209).

Figure 5:
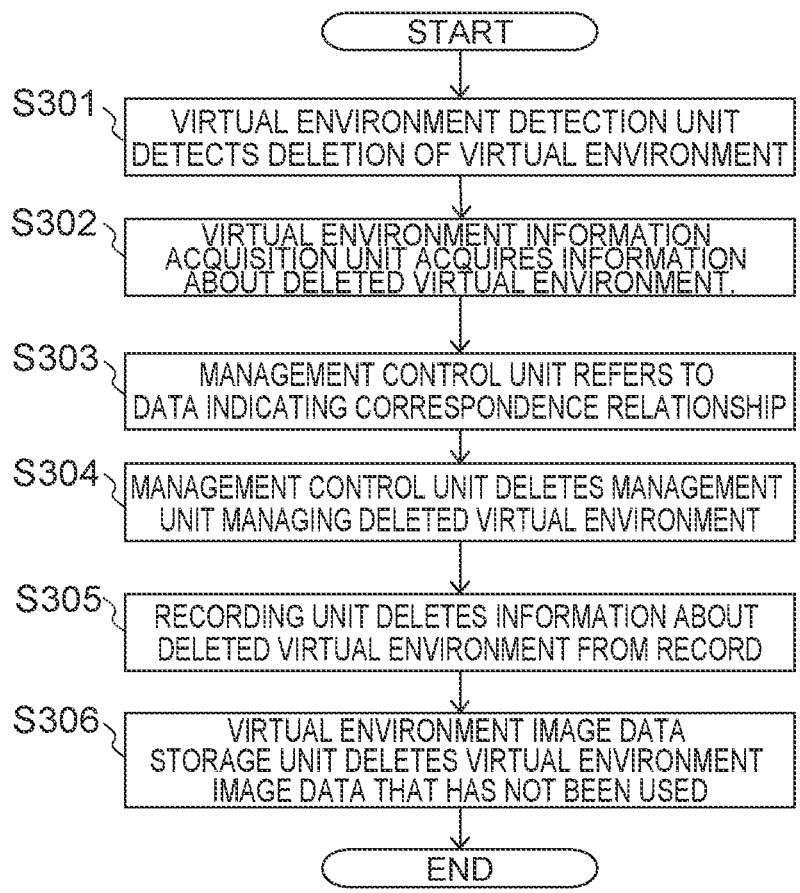
FIG. 5 is a schematic flowchart of processing at the end of the virtual environment according to the first embodiment.

Next, a flow of the process at the end of the virtual environment 121 will be described. FIG. 5 is a schematic flowchart of processing at the end of the virtual environment 121 in the first embodiment.

First, the virtual environment detection unit 142 detects the end of the virtual environment 121 (S301). Next, the virtual environment information acquisition unit 145 acquires information for identifying the virtual environment 121 whose deletion has been detected (S302). The management control unit 146 refers to the data indicating the correspondence relationship, and identifies and deletes the management unit 13 corresponding to the virtual environment 121, that is, the management unit 13 that manages the deleted virtual environment 121 (S304). Upon receiving the deletion, the recording unit 147 deletes the information about the deleted virtual environment 121 from the record (S305).

Thereafter, the virtual environment image data storage unit 11 deletes the virtual environment image data satisfying the condition that the period in which the virtual environment image data is no longer used exceeds the predetermined period (S305), and this flow ends. This is because the virtual environment image data may be used again in a short time, such as relaunch. A condition for determining that it is no longer used may be appropriately determined. For example, when the number of days after the virtual environment 121 is deleted exceeds a threshold value, the virtual environment may be deleted.

As described above, the information processing apparatus 1 of the present embodiment controls the plurality of virtual environments 121, but can individually provide the security policy of each virtual environment 121. Further, in the present embodiment, it is confirmed that the security file stored in each virtual environment 121 is normal. As a result, even when the security file is stored in the virtual environment 121, it is possible to reduce a possibility that unauthorized software is executed by deleting or modifying the security file by malicious software or the like.

In the present embodiment, since there is a possibility that the security file is subjected to an attack, normality of the security file is confirmed at the time of detecting execution of the software. In addition, when the security file is subjected to an attack, the security may be further improved by adding a process for avoiding the attack.

For example, the software detection unit 144 can detect the predetermined process such as deletion or editing of a file in the virtual environment 121 by a means similar to the software detection, and can acquire a path name of a target file. Therefore, in a case where a file whose deletion or the like is not allowed is described in the security file, the process can be performed similarly to the flow of software execution control illustrated in FIG. 4. That is, the process such as file deletion and file editing may also be regarded as software processing.

In addition to the security file, data indicating a file whose deletion or the like is not allowed may be stored in advance in the control storage unit 141. In this case, after the virtual environment information acquisition unit 145 acquires the information about the virtual environment 121, the software execution control unit 148 may refer to the data, stop the process in a case where the detected file to be processed is a file that is not allowed to be processed such as a security file, and execute the process in a case where the detected file to be processed is other than the file that is not allowed to be processed such as the security file. Note that, similarly to the execution control of the software, the predetermined error process may be performed, and an error may be output to, for example, a predetermined log, a monitor connected to the information processing apparatus 1, or the like.

Note that, in the above description, the software detection unit 144 also detects the predetermined process such as deletion and editing of a file, but the components may be divided as described above according to a difference between detection targets. That is, in addition to the software detection unit 144, a detection unit that detects deletion of a file, a detection unit that detects editing of a file, and the like may be provided in the information processing apparatus 1.

Note that, in the above description, the management unit 13 accesses the security file stored in the virtual environment 121 every time when software is detected, and makes the execution determination of the software based on the information about the security file. However, the management unit 13 may store the security file once determined to be normal without repeating the process, and make the execution determination using the stored security file as a reference.

In addition, the management unit 13 may transmit the security file determined to be normal to the virtual environment control unit 14, and thereafter, instead of the management unit 13, the virtual environment control unit 14 may make the execution determination of the software. For example, until a predetermined period elapses after the virtual environment control unit 14 received the information, instead of the management unit 13, the virtual environment control unit 14 can make the execution determination based on the information.

Second Embodiment

In the first embodiment, one management unit 13 may manage one virtual environment 121 or may manage a plurality of virtual environments 121. However, in a case where one management unit 13 manages one virtual environment 121, as the number of virtual environments 121 increases, the number of management units 13 also increases, and resources such as a memory and a computing processor unit (CPU) usage rate of the information processing apparatus 1 are consumed. Therefore, in a case where the execution determination for the created virtual environment 121 is unnecessary, it is also effective from the viewpoint of resources not to create the management unit 13.

Therefore, in the present embodiment, the management control unit 146 does not create the management unit 13 to manage the virtual environment 121 satisfying a predetermined condition such as the absence of the security file. For example, in a process in which the virtual environment information acquisition unit 145 acquires information about the virtual environment 121, the security file in the virtual environment image data is searched for, and in a case where the security file does not exist, the management control unit 146 may not create the management unit 13 that manages the virtual environment 121.

Figure 6:
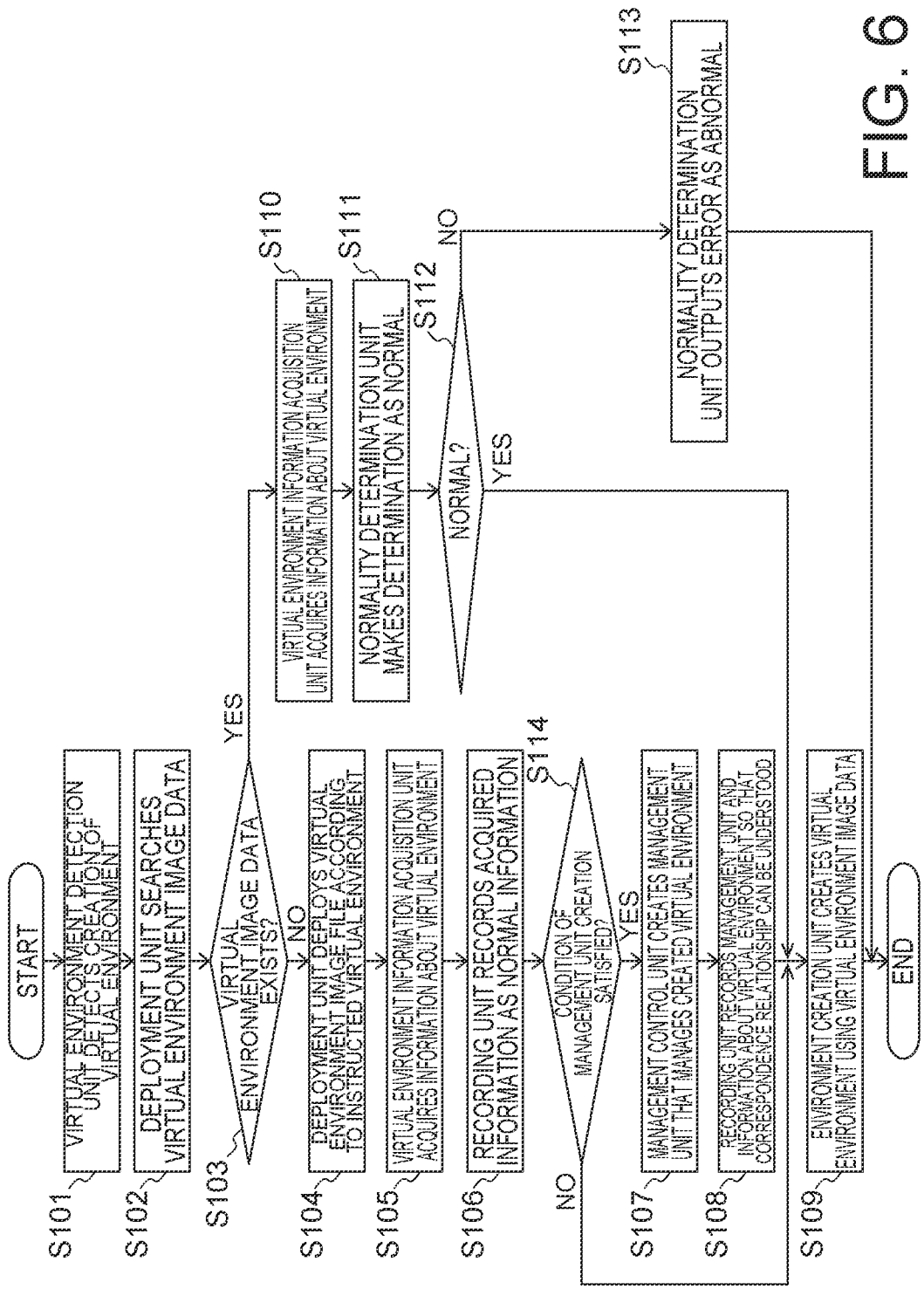
FIG. 6 is a schematic flowchart of processing at the time of launch of the virtual environment according to the second embodiment.

FIG. 6 is a schematic flowchart of processing at the time of launch of the virtual environment 121 according to the second embodiment. In this flow, a state that the virtual environment 121 does not have the security file is a condition that the management unit 13 is not created. Differences from the flow in the first embodiment will be described.

When the virtual environment image data does not exist (NO in S103), the virtual environment information acquisition unit 145 acquires information about the virtual environment 121 (S105), and the acquired information is recorded as normal information by the recording unit 147 (S106), which is similar to the first embodiment. However, in the second embodiment, the virtual environment information acquisition unit 145 also acquires information about the security file as information about the virtual environment 121. For example, the path name of the security file is acquired. Information about the security file is also recorded as normal information by the recording unit 147. When the security file does not exist in the virtual environment 121, information indicating that the security file does not exist in the virtual environment 121 is recorded. For example, the path name of the security file is recorded as "NULL".

Then, a conditional branch (S114) is added such that the flow is branched according to the existence of the security file which is the creation condition of the management unit 13. When the security file exists (YES in S114), the processes in S107 and S108 are performed similarly to the flow in the first embodiment, and the management unit 13 that manages the virtual environment 121 is created and recorded. On the other hand, when the security file does not exist (NO in S114), the processes in S107 and S108 are omitted. As a result, the number of the management units 13 is smaller than the number of the virtual environments 121.

Figure 7:
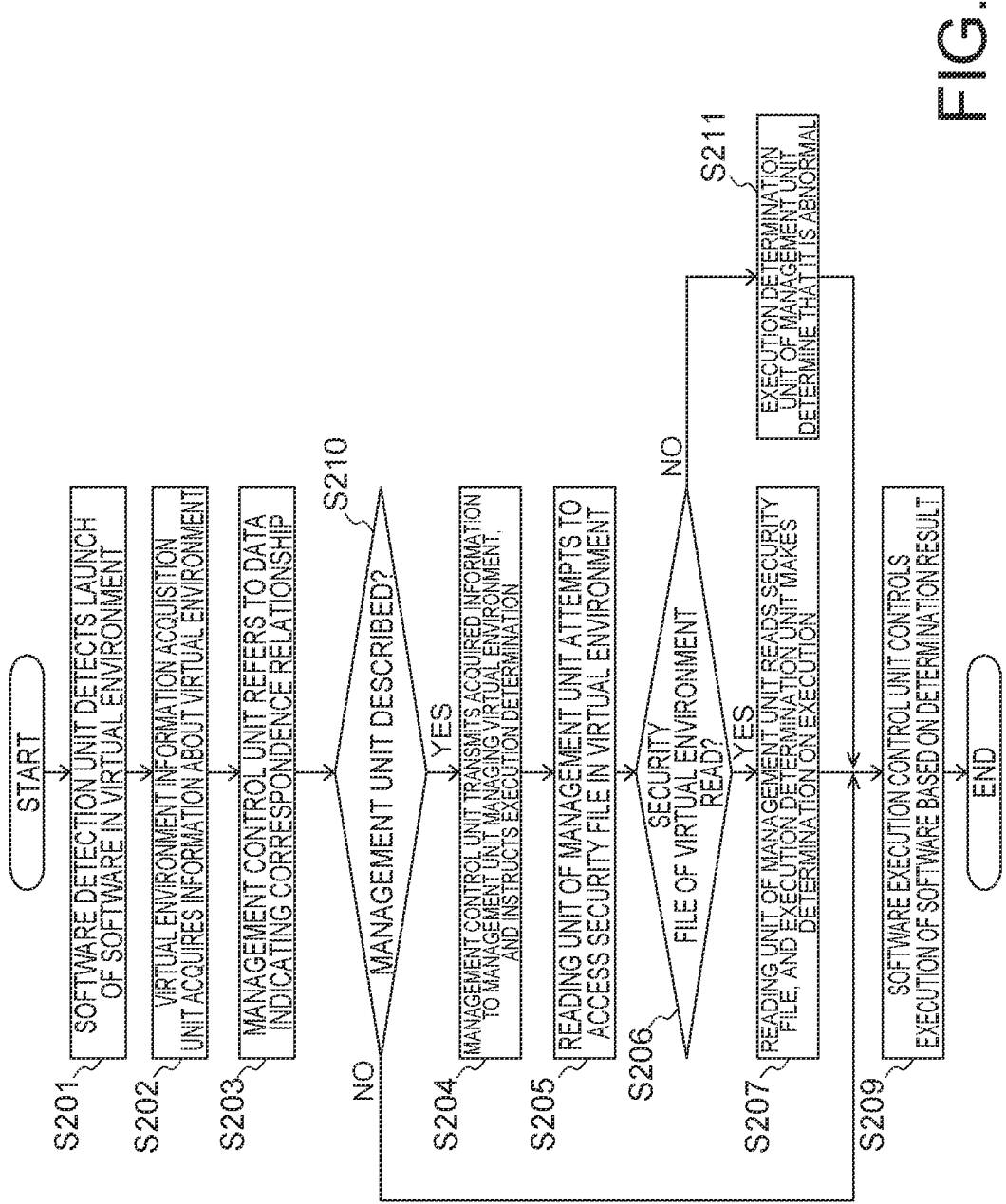
FIG. 7 is a schematic flowchart of processing related to execution control of software according to the second embodiment.

FIG. 7 is a schematic flowchart of processing related to execution control of software according to the second embodiment. As illustrated in FIG. 6, the second embodiment is different from the first embodiment in that there is no management unit 13 that manages the virtual environment 121 even when the virtual environment 121 is created, and the management unit 13 corresponding to the virtual environment 121 in which the execution of the software is detected may not be recorded in the data indicating the correspondence relationship between the virtual environment and the management unit 13. Therefore, a conditional branch (S210) is added after the process (S203) in which the management control unit 146 refers to the data indicating the correspondence relationship between the virtual environment and the management unit 13. In addition, in this flow, the process of S211 is added instead of the process of S208.

In a case where the management unit 13 is not described in the data (NO in S210), since the management unit 13 does not exist, the processes S204 to S208 for the management unit 13 are not executed. In a case where the determination is omitted, the software execution control unit 148 performs control to execute the software (S209). In this way, execution of the software is permitted for the virtual environment 121 in which the management unit 13 to perform management does not exist.

On the other hand, when the management unit 13 is described in the data (YES in S210), the process proceeds as in the first embodiment, but when the reading unit 131 of the management unit 13 attempts to access the security file in the virtual environment and the security file does not exist (NO in S06), the execution determination unit 132 of the management unit 13 determines that it is abnormal (S211). When the management unit 13 exists, the security file also exists. Therefore, unlike the first embodiment, when the security file does not exist, the execution determination is determined to be abnormal, and the software execution control unit 148 performs control to stop the software (S209).

In the second embodiment, it is found that it is abnormal when the reading unit 131 of the management unit 13 cannot access the security file. Therefore, the reading unit 131 of the management unit 13 may periodically access the security file in the virtual environment. In this case, the execution determination is not made every time the access is made, and when the access cannot be made, the virtual environment control unit 14 is notified of the fact, and the normality determination unit 149 may determine that it is abnormal based on the notification. As a result, it is possible to quickly detect an abnormal event in the security file without increasing the load on the virtual environment 121 and the management unit 13.

Figure 8:
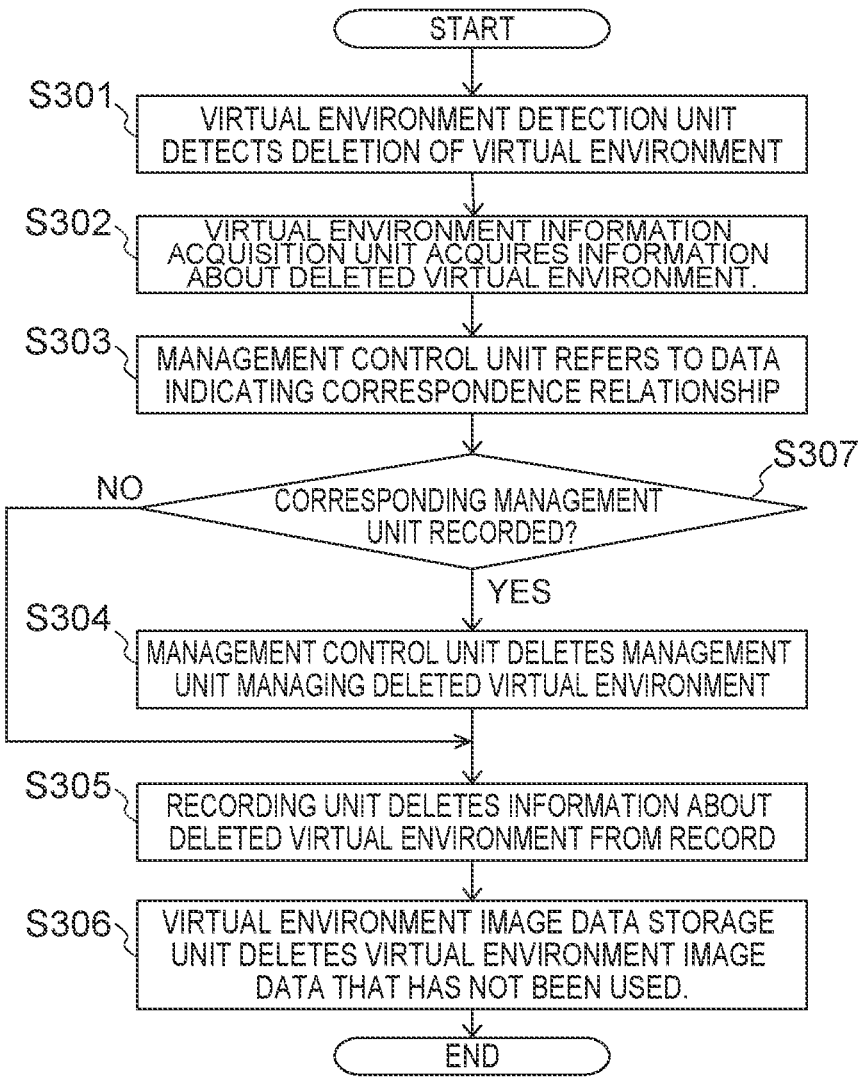
FIG. 8 is a schematic flowchart of processing at the end of the virtual environment according to the second embodiment.

FIG. 8 is a schematic flowchart of processing at the end of the virtual environment 121 in the second embodiment. As illustrated in FIG. 6, the second embodiment is different from the first embodiment in that there is no management unit 13 that manages the virtual environment 121 even when the virtual environment 121 is created, and the management unit 13 corresponding to the virtual environment 121 in which the execution of the software is detected may not be recorded in the data indicating the correspondence relationship between the virtual environment and the management unit 13. Therefore, a conditional branch (S307) is added after the process (S303) in which the management control unit 146 refers to the data indicating the correspondence relationship between the virtual environment and the management unit 13.

When the corresponding management unit 13 is recorded (YES in S307), similarly to the first embodiment, the management control unit 146 deletes the management unit 13 that manages the deleted virtual environment 121 (S304). On the other hand, in a case where the corresponding management unit 13 is not recorded (NO in S307), there is no management unit 13 that manages the deleted virtual environment 121, and thus, the process of S304 is omitted. The subsequent processing is the same as that of the first embodiment.

As described above, in the present embodiment, creation of the unnecessary management unit 13 can be suppressed, and consumption of resources of the information processing apparatus 1 can be suppressed.

Third Embodiment

In the embodiments so far, the virtual environment 121 is accessed, the security file that might be attacked is read, and the execution determination of the software is made based on the read security file. Therefore, it is necessary to check whether the read security file is normal.

Therefore, in the present embodiment, the execution determination is made without using the security file that might be attacked.

Figure 9:
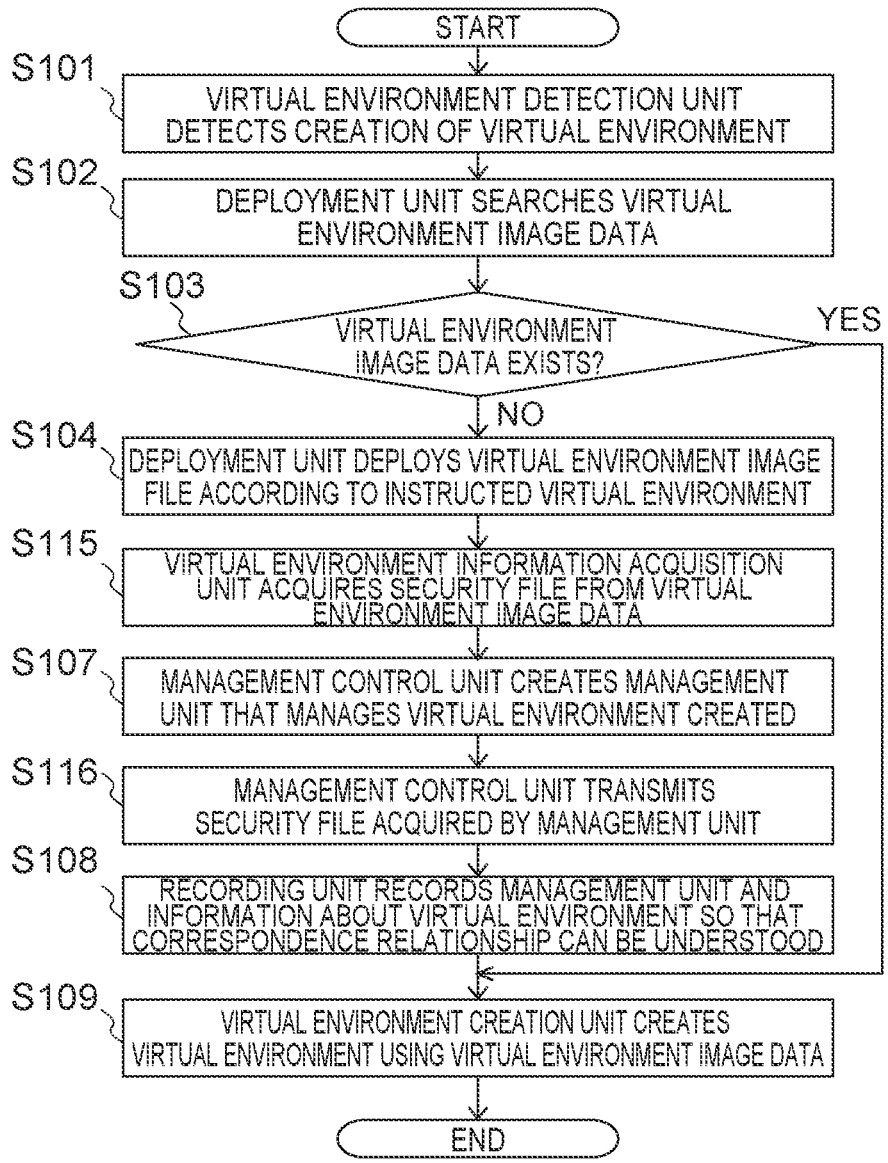
FIG. 9 is a schematic flowchart of processing at the time of launch of the virtual environment according to the third embodiment.

FIG. 9 is a schematic flowchart of processing at the time of launch of the virtual environment 121 in the third embodiment.

In the flow in the first embodiment illustrated in FIG. 3, when the virtual environment image data does not exist (NO in S103), the virtual environment information acquisition unit 145 acquires the information about the virtual environment 121 (S105), but in the third embodiment, the virtual environment information acquisition unit 145 acquires the security file from the virtual environment image data (S115). The acquired file is treated as a normal file that is not attacked, and the management control unit 146 transmits the acquired security file to the management unit 13 (S116). As a result, the management unit 13 can acquire the normal security file and can make an execution determination based on the normal security file.

In the third embodiment, since it is not necessary to make the normality determination, when there is virtual environment image data (YES in S103), the virtual environment creation unit creates the virtual environment 121 simply using the virtual environment image data (S109).

Figure 10:
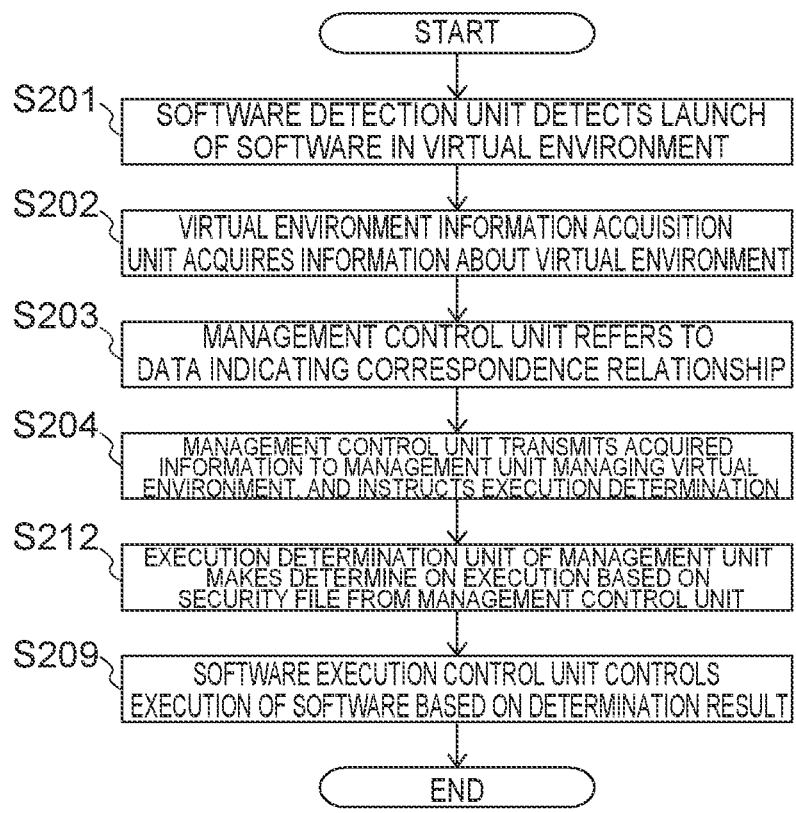
FIG. 10 is a schematic flowchart of processing related to execution control of software according to the third embodiment.

FIG. 10 is a schematic flowchart of processing related to execution control of software according to the third embodiment.

Since the management unit 13 has acquired the security file in the process at the time of launch of the virtual environment 121, there is no process (S205) in which the management unit 13 reads the security file of the virtual environment 121, and the execution determination unit 132 of the management unit 13 makes the execution determination based on the security file acquired from the management control unit 146 (S212). The other processing is similar to that of the first embodiment.

As described above, in this flow, since the execution determination is made based on the normal security file acquired in advance, even when the security file is modified in the virtual environment 121, the normality is guaranteed.

Note that, in this flow, the management unit 13 makes the execution determination as in the previous embodiments, but the management unit 13 does not need to make the execution determination, and the virtual environment control unit 14 may make the execution determination. In a case where the virtual environment control unit 14 makes the execution determination, it is not necessary for the virtual environment control unit 14 to transmit the security file and the information about the software whose execution was detected to the management unit 13.

Note that the flow of the termination processing may be similar to that of the first embodiment, and thus will be omitted.

As described above, in the present embodiment, the execution determination is made without using the security file that might be attacked. As a result, the validity of the execution determination can be guaranteed.

At least part of the above embodiment may be realized by a dedicated electronic circuit (that is, hardware) such as an integrated circuit (IC) on which a processor, a memory, and the like are mounted. At least part of the above embodiment may be realized by executing software (program). For example, using a general-purpose computer device as basic hardware and causing a processor such as a CPU mounted on the computer device to execute a program, it is possible to realize the process of the above embodiments. That is, each unit illustrated in FIG. 1 can be implemented as a process.

For example, the computer can be the apparatus of the above embodiment by the computer reading dedicated software stored in a computer-readable storage medium. The type of the storage medium is not particularly limited. In addition, the computer can be the apparatus of the above embodiment by the computer installing dedicated software downloaded via the communication network. In this way, information processing by software is specifically implemented using hardware resources.

Figure 11:
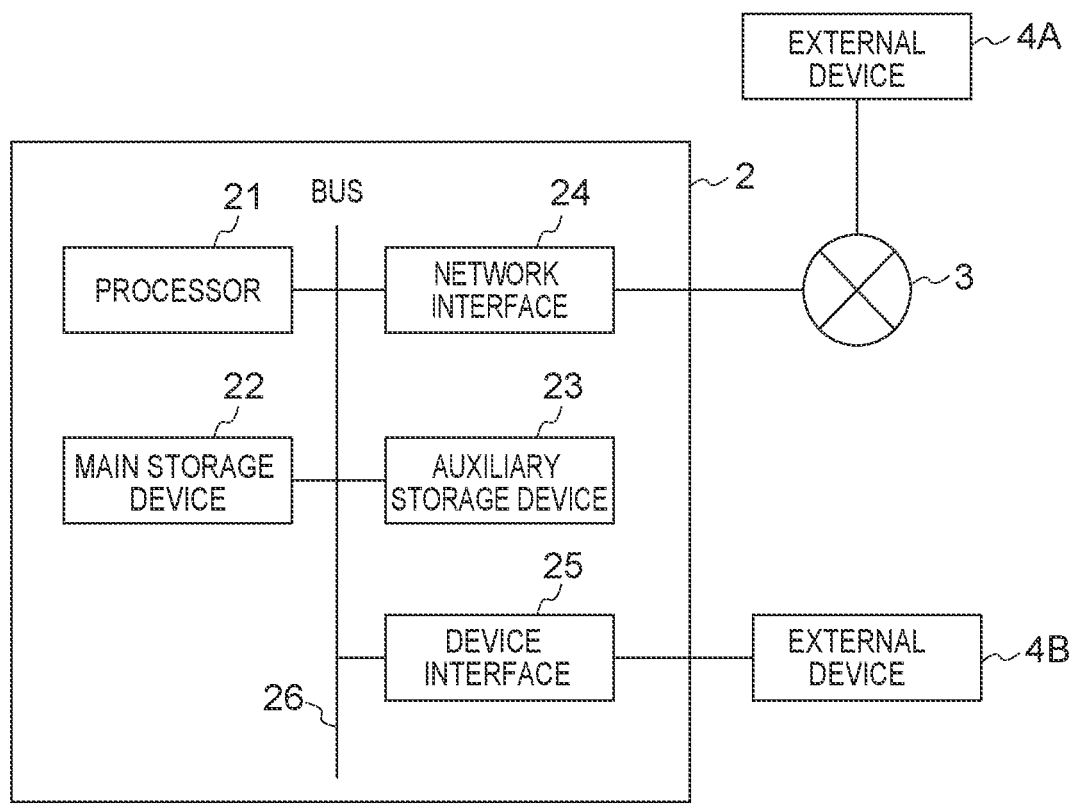
FIG. 11 is a block diagram illustrating an example of a hardware configuration according to an embodiment of the present disclosure.

FIG. 11 is a block diagram illustrating an example of a hardware configuration according to an embodiment of the present disclosure. The information processing apparatus 1 includes a processor 21, a main storage device 22, an auxiliary storage device 23, a network interface 24, and a device interface 25, and can be realized as a computer device 2 connected thereto via a bus 26. Each storage unit of the information processing apparatus 1 can be realized by the main storage device 22 or the auxiliary storage device 23, and components other than the storage unit such as the virtual environment control unit 14 can be realized by the processor 21.

Note that the computer device 2 in FIG. 11 includes components the number of which is one, but may include a plurality of the same components. In addition, although FIG. 11 illustrates one computer device 2, software may be installed in a plurality of computer devices, and each of the plurality of computer devices may execute different partial process of the software.

The processor 21 is an electronic circuit including a control device and an arithmetic device of a computer. The processor 21 performs an arithmetic process based on data and programs input from each device or the like of the internal configuration of the computer device 2 to output a calculation result and a control signal to each device or the like. Specifically, the processor 21 executes an OS, software, or the like of the computer device 2, and controls each device constituting the computer device 2. The processor 21 is not particularly limited as long as it can perform the above processing.

The main storage device 22 is a storage device that stores instructions executed by the processor 21, various pieces of data, and the like, and information stored in the main storage device 22 is directly read by the processor 21. The auxiliary storage device 23 is a storage device other than the main storage device 22. Note that these storage devices mean any electronic component capable of storing electronic information, and may be a memory or a storage. The memory includes a volatile memory and a non-volatile memory, but may be any of them.

The network interface 24 is an interface for connecting to the communication network 3 wirelessly or by wire. As the network interface 24, a network interface conforming to an existing communication standard may be used. The network interface 24 may exchange information with an external device 4A connected for communication via the communication network 3.

The device interface 25 is an interface such as a USB directly connected to an external device 4B. The external device 4B may be an external storage medium or a storage device such as a database.

The external devices 4A and 4B may be output devices. The output device may be, for example, a display device that displays an image, a device that outputs sound or the like, or the like. Examples thereof include a liquid crystal display (LCD), a cathode ray tube (CRT), a plasma display panel (PDP), a speaker, and the like, but are not limited thereto.

Note that the external devices 4A and 4B may be input devices. The input device includes devices such as a keyboard, a mouse, and a touch panel, and provides information input by these devices to the computer device 2. A signal from the input device is output to the processor 21.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An information processing apparatus comprising processing circuitry configured to:
deploy an image file and to create files used for a virtual environment;
create the virtual environment using the files;
record information about a first file included in the files;

access the first file stored in the virtual environment and to determine, based on information acquired by accessing the first file, whether to execute software whose execution was detected in the virtual environment, by a manager;
determine, based on a difference between information acquired by accessing the first file and information about the recorded first file, whether the first file is normal; and
when there is no manager configured to manage the created virtual environment, create the manager that manages the created virtual environment,
wherein even when there is no manager that manages the created virtual environment, the manager corresponding to a virtual environment is not created when information that the first file exists in the created virtual environment is not recorded.

2. The information processing apparatus according to claim 1, wherein the processing circuitry is configured to:
perform control such that the software is not executed in the virtual environment in a case where it is determined that the first file is not normal or in a case where it is determined that the software is not allowed to be executed.

3. The information processing apparatus according to claim 1, wherein
it is determined that the first file is not normal when information that the first file exists is recorded and information that the first file does not exist is acquired.

4. The information processing apparatus according to claim 1, wherein
it is determined that the first file is not normal when a recorded path name and an acquired path name of the first file are different from each other.

5. The information processing apparatus according to claim 1, wherein
it is determined that the first file is not normal when a recorded hash value and an acquired hash value of the first file are different from each other, or when a recorded hash value and a hash value calculated based on acquired information of the first file is different from each other.

6. The information processing apparatus according to claim 1,
wherein the processing circuitry is further configured to detect execution of the software in the virtual environment, wherein
the manager is configured to acquire information about the first file when the execution is detected.

7. The information processing apparatus according to claim 1, wherein the processing circuitry is further configured to detect deletion of a file in the virtual environment, wherein
it is determined that the first file is not normal when deletion of the first file is detected and information that the first file exists is recorded.

8. The information processing apparatus according to claim 1, wherein
the manager is configured to periodically acquire information about the first file.

9. An information processing method comprising:
deploying an image file and creating files used for a virtual environment;
creating the virtual environment using the files;
recording information about a first file included in the files;
accessing the first file stored in the virtual environment;
determining, based on information acquired by accessing the first file, whether to execute software whose execution was detected in the virtual environment, by a manager;
determining, based on a difference between information acquired by accessing the first file and information about the recorded first file, whether the first file is normal; and
creating the manager,
wherein
when there is no manager configured to manage the created virtual environment, the management controller is configured to create the manager that manages the created virtual environment, and
even when there is no manager that manages the created virtual environment, the manager corresponding to a virtual environment is not created when information that the first file exists in the created virtual environment is not recorded.

10. The information processing method according to claim 9, wherein
the method includes performing control such that the software is not executed in the virtual environment in a case where it is determined that the first file is not normal or in a case where it is determined that the software is not allowed to be executed is further included.

11. The information processing method according to claim 9, wherein
the method includes determining that the first file is not normal when information that the first file exists is recorded and information that the first file does not exist is acquired.

12. The information processing method according to claim 9, wherein
the method includes determining that the first file is not normal when a recorded path name and an acquired path name of the first file are different from each other.

13. The information processing method according to claim 9, wherein
the method includes determining that the first file is not normal when a recorded hash value and an acquired hash value of the first file are different from each other, or when a recorded hash value and a hash value calculated based on acquired information of the first file is different from each other.

14. The information processing method according to claim 9, further comprising:
detecting execution of the software in the virtual environment, wherein
the method includes acquiring information about the first file when the execution is detected.

15. The information processing method according to claim 9, further comprising:
detecting deletion of a file in the virtual environment, wherein
the first file is determined to be not normal when deletion of the first file is detected and information that the first file exists is recorded.

16. A non-transitory computer-readable recording medium storing a program executed by a computer, the medium causing the computer to execute:
deploying an image file and creating files used for a virtual environment;
creating the virtual environment using the files;

recording information about a first file included in the files;
accessing the first file stored in the virtual environment;
determining, based on information acquired by accessing the first file, whether to execute software whose execution was detected in the virtual environment, by a manager;
determining, based on a difference between information acquired by accessing the first file and information about the recorded first file, whether the first file is normal; and
creating the manager,
wherein
   when there is no manager configured to manage the created virtual environment, the manager is configured to create the manager that manages the created virtual environment, and
   even when there is no manager that manages the created virtual environment, the manager corresponding to a virtual environment is not created when information that the first file exists in the created virtual environment is not recorded.

* * * * *